July 12, 1938.                R. L. STEVENS ET AL                2,123,812
APPARATUS FOR ELECTRICALLY TESTING MATERIALS
Filed April 10, 1935

INVENTORS
J. P. DALLAS
BY and R. L. STEVENS
G. Ward Kemp
ATTORNEY

Patented July 12, 1938

2,123,812

UNITED STATES PATENT OFFICE 2,123,812

APPARATUS FOR ELECTRICALLY TESTING MATERIALS

Robert L. Stevens and James P. Dallas, Seattle, Wash., assignors of one-half to Dillon Stevens and one-half to M. B. Pendleton, both of Los Angeles, Calif.

Application April 10, 1935, Serial No. 15,633

16 Claims. (Cl. 175—183)

This invention relates to condenser plate devices for use in combination with electrically operated, material testing apparatus, having reference particularly to a testing apparatus of the type where the introduction of the material to be tested in a high frequency alternating current field, causes changes in associated electrical circuits, which are correlated with the properties to be indicated or measured, and which may be indicated on suitable meters or recording devices.

Types of apparatus have been used for determining the moisture content of wood and the electrical properties of insulating materials, but in the equipment heretofore known it has been the practice to produce the high frequency test field between the plates of a condenser, with the material to be tested acting as the dielectric of that condenser. It has also been the practice to arrange the plates of such test condensers in different planes, usually opposite and parallel to each other, and operated by the material to be tested.

It will be understood by those skilled in the art, that when any materials such as wood, cereals, etc., are brought or placed in the high frequency field of condenser plates when coupled with a proper high frequency test apparatus, the variations in the characteristics of the wood, etc., affect the electrical field from the condenser, and that meters of known construction will indicate such variations.

It is therefore an object of our invention to provide certain novel arrangements of a test condenser with its plates all in the same plane and with the mechanical and electrical construction of the condenser (herein called a device) so formed that more accurate and convenient testing may be done with this type of equipment which we will refer to as a high frequency test apparatus.

It is difficult, or altogether impossible to test the moisture content of various portions of a cement wall or to discover the presence of moist spots within the wall, with high frequency test apparatus using the usual type of test condenser. With such usual type of test condenser the material to be tested must be placed between the test plates, and usually specimens must be taken and cut to definite sizes.

The advantages of our test condenser, or device, with its plates all on the same plane are many. By the use of the device of our invention, with the condenser plates in the same plane, tests may be made of any wall, or material, by simply applying the plates to a surface of the material to be tested. Since the effective field of the condenser plates extends a considerable distance, conditions not only on the surface but in the interior of the material, or beyond, may be tested, thus permitting a readily portable and convenient device and apparatus to be used.

Another advantage of our device is, that after a certain minimum thickness of the material to be tested is exceeded, then variations in the thickness produce no change in the action of the apparatus. This is true because the condenser plates of our device, being mechanically fixed in one plane, do not affect the electric circuits to which they are connected, when the thickness or properties of the materials tested vary beyond the effective depth of the field of the plates in the material being tested, which, for a given apparatus and material, has very definite limits. Thus with our device, a high frequency test apparatus may be built, which will test lumber of any commercial thickness, so long as it exceeds a certain minimum, which for some types of apparatus might be ⅝ of an inch in thickness. This constitutes a great improvement in the usefulness of such apparatus, since with the usual type of parallel opposite plate test condenser, the separation of the plates and the thickness of the material are quite critical, and great errors may result, if the specimens under test vary in thickness.

Another object of our invention is to provide in the device a plurality of plates in the same plane, arranged to compensate for unevennesses in texture, such as the grain of wood or stratification of other materials. It has been the practice to require that readings of electrical moisture testing apparatus for wood, be taken in a certain relation to the grain thereof. With our device, a plurality of plates may be arranged as hereinafter shown, so that the relation of the grain of the wood to the position of the test plates no longer affects the reading or disclosures of the apparatus.

Still another object and advantage of our device lies in the fact that with a plurality of plates disposed in the same plane, it is possible to independently spring, or mount, the plates so accurate readings may be obtained, by high frequency test apparatus, on materials that are not exactly smooth or flat. Our separately mounted plates are resiliently disposed so that they severally conform to the surfaces under test, thus assuring that accurate test conditions may be obtained.

With these and other objects as will hereinafter appear, we have illustrated our invention by the accompanying drawing, of which:

Like numerals on the different figures represent like parts.

Figure 1:
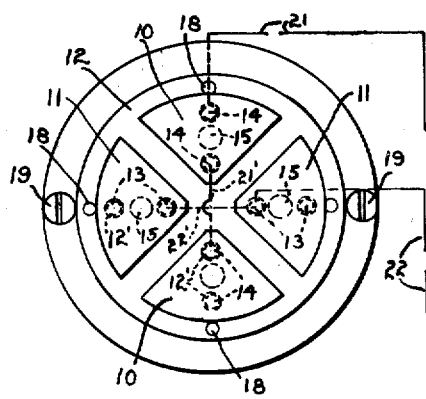
Figure 1 shows a top plan of one form of the condenser plates connected with a schematic diagram of a high frequency electric apparatus.
Figure 2:
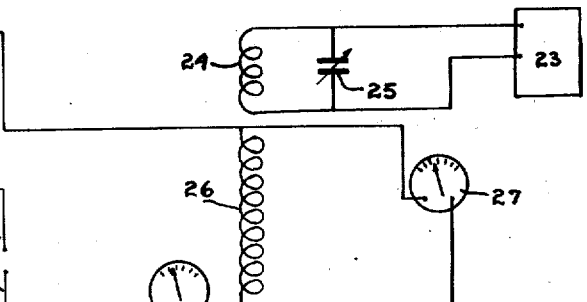
Figure 2 shows a side elevation in section of the plates shown in Fig. 1, with assembly, for operation.
Figure 2:
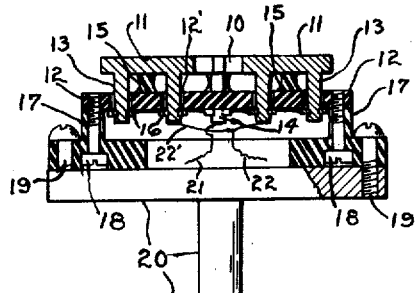

Numerals 10—10 and 11—11, represent duplicate pairs of flat surfaced substantially sector-shaped condenser plates, which are adjustably mounted over an insulating block 12. These plates are preferably four in number and substantially quadrant-shaped, being disposed so that their arcuate edges define a circle, and their straight edges lie parallel to one another to form a uniform width, cross-shaped gap, as illustrated. These plates carry relatively narrow guide pins 13, and 14, which are slidably positioned through holes 12' in said block. The condenser plates are normally pressed outward or away from said block by relatively narrow soft rubber posts 15, or other suitable resilient means, positioned between the block and plates; but the pins are prevented from being disconnected from the block by clinching washers on the ends thereof below the block, as 16.

The insulating block is preferably attached to a supporting member 17, by any suitable means as screws 18, and the member 17, for convenience in operation of the device, may be attached by any suitable means as screws 19, to any suitable operating handle as 20.

Electrical wires 21 and 22, are attached respectively to the pins 13 and 14 of the respective pairs of plates 10 and 11, for completing the circuit for the high frequency test apparatus. The current is carried through each of the duplicate sets of plates 10 and 11, by loop wires as 21' and 22' between the two sets of plates. Thus permitting the separated plates to cover a wide or extensive surface to be tested, but being separately disposed on the pins resiliently, the plates readily yield to, and conform with, uneven surfaces on wood or other materials to which they are applied for testing.

It will be understood that the results of measurements and tests of woods taken on lines parallel with different grains therein, will frequently vary materially, from the results of such measurements or tests taken across the wood grains. By the use of the forms and arrangements of our condenser plates, this difficulty is avoided, as the plates and gaps extend both across, as well as parallel with the grains in the wood to be tested.

Therefore accurate conditions of the wood to be tested will be obtained and disclosed on the meters, regardless of the position in which the plates are applied to the grains in the wood to be tested.

We have illustrated a high frequency test apparatus diagrammatically in Fig. 1. This consists of a source, or generator of high frequency energy, indicated conventionally as 23. This may be a vacuum tube oscillator connected to a means of coupling or introducing the high frequency energy into the test circuit. This function is performed as indicated in the diagram, by an inductance 24 and capacitor 25, parts of the high frequency generator circuit. These are inductively coupled to inductance 26 in the test circuit. Altogether the high frequency generator 23, inductance 24, and capacitor 25, and inductance 26, comprise one means, of many possible ways, of supplying a high frequency electric current to the condenser plates, which are shown in the diagram to be connected across inductance 26.

A high frequency test apparatus must further include means for indicating, detecting or registering, the changes which will occur in the values of the current flowing in various parts of the test circuit, when the material to be tested is placed in the high frequency field, radiated from the flat surfaces of the condenser plates 10 and 11. In the diagram, the indicating function is shown as one or more suitable known meters, or registering devices as 27 and 28, for any given particular test to be made.

It will be understood that the condenser plates are means for applying the electrical energy generated in the high frequency apparatus, to the material to be tested; and the high frequency apparatus includes the indicating means for registering the variations in the electrical current values caused by the action of the materials to be tested, on the characteristics of the condenser.

Figure 3:
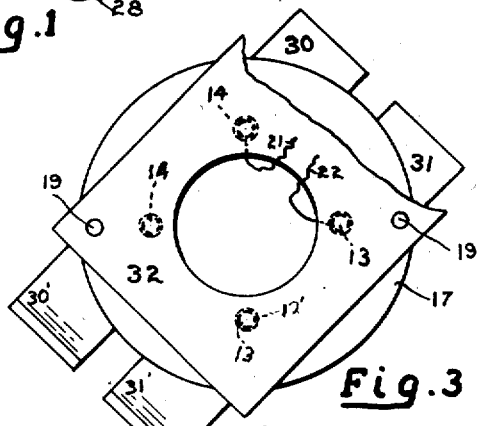
Figure 3 is a plan view of another form of plates, for testing lumber.
Figure 4:
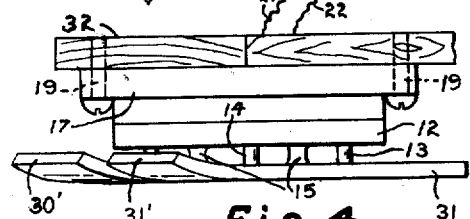
Figure 4 is a perspective view of the form shown in Fig. 3.

In Figures 3 and 4, we have shown a modified form of similar condenser plates as 30 and 31, designed for testing lumber, while the same is being continuously, or consecutively moved along a given track or conveyor. For this use, we prefer to construct the plates in rectangular form, with the front ends thereof upturned as 30' and 31', to permit the lumber to freely enter beneath the plates for testing. In this application, the support member 17 is preferably attached to a beam 32, or other object above, with the plates extended downward. As the lumber passes beneath the plates, the meters indicate the moisture content, or other characteristics of the several pieces, or parts of the lumber, and the respective conditions may be then separately marked on the lumber as desired.

Figure 5:
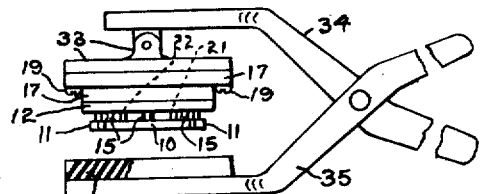
Figure 5 is a side elevation of a special method of mounting the plates for testing thin materials.

In Figure 5, we show another adaptation for special use of the condenser plates, for testing plywood or other thin materials. In such cases, the lines of energy would normally pass beyond the material to be tested, and so fail to register the true conditions on the meters. To overcome this difficulty we preferably attach the supporting member 17 to a bar 33, which is pivotally connected to an upper jaw 34 of compensating tongs. On the lower jaw 35 beneath and opposite the plates we mount a suitable block of hard rubber, or other suitable materials. Thus as the ply wood is placed between the plates and the rubber block, a true test is obtained.

Figure 6:
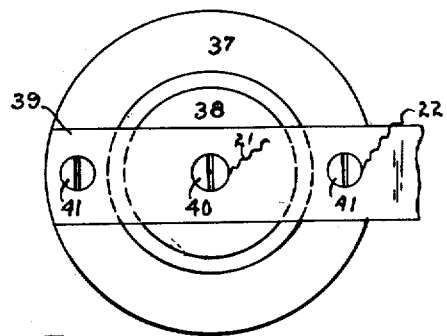
Figure 6 is a top plan of a pair of disc plates mounted on an insulating handle, for testing various materials.
Figure 7:
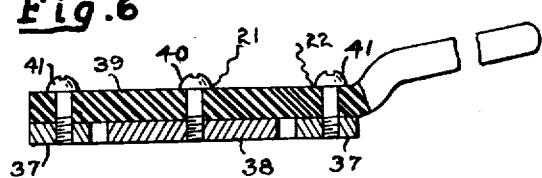
Figure 7 is a side elevation of the form shown in Fig. 6.

In Figures 6 and 7 we show still another method of applying the condenser plates, for testing moisture, etc., in wood and various materials. Here we preferably use two flat discs, 37 and 38, or condenser plates mounted concentrically in the same plane, upon an insulating supporting means or handle 39, by suitable binding screws 40 and 41, said discs spaced apart by a uniform gap of suitable width. The circuit wires, 21 and 22, are severally attached to one of the screws in respective discs. The operator applies the disc plates to any material to be tested, and the meters in the circuit show the characteristics found.

In operating the device and apparatus, the condenser plates are respectively attached to the respective ends of wires in a high frequency electric circuit, the plates insulated from each other, and placed in positions adjacent the materials to be tested on the same plane with each other, and a current of high frequency electrical energy passed through the apparatus and plates.

To those skilled in the art it will be understood that all materials in the field of the condenser plates, both the material in front being tested and that used as a supporting means behind the plates, will have an effect on the registrations of the apparatus. To reduce this undesirable effect of the supporting and insulating members of a high frequency test condenser to a minimum, the condenser plates may be mounted on pins or other support means of relatively narrow or small cross-sectional area, with the bulk of the insulating and supporting members of the condenser at a considerable distance from the plates themselves, and out of the most concentrated portions of the condenser field. There is also in practice some leakage between the condenser plates, and a construction is desirable to make the leakage path between oppositely poled condenser plates of considerable length and thereby reduce the leakage between plates when the device is operated in a humid atmosphere, where otherwise there might be considerable error from close contacts.

Again while it is common to designate the condenser plates as the means of measuring; yet since the condenser field is most concentrated in the gaps between the plates, it is believed that most of the measuring is actually done in said gaps or spaces between such plates where the field is most concentrated. It is therefore important that both such plates and gaps be positioned circuitously or in opposite directions, where both width as well as length of a material is to be tested. This is particularly important where wood and lumber in its natural state with varying lines or grains, of varying degrees of hardness, would present varying results under test, without such arrangement.

In our constructions as herein illustrated, we have, met these questions, by providing supporting pins and posts for the condenser plates of relatively small area, which maintain the said plates away from the rest of the device and its attendent undesirable effects. We have by our construction also extended the leakage path between oppositely poled plates, as far as possible considering the relative size of the device. We have further shown the plates and separating gaps arranged circuitously or in opposed directions in several of the forms disclosed.

Having described our invention, we claim as new:

1. An electrical apparatus for testing qualities of material, comprising a plurality of condenser plates spaced apart from each other laterally by gaps, an insulating block behind and spaced apart from said plates provided with relatively small apertures therethrough opposite said plates respectively, supporting guide pins slidably mounted through said apertures, the outer ends of said pins affixed to the bases of said plates respectively and the inner ends of said oppositely positioned pins connected with wires of different poles respectively for an electric circuit, means for limiting the outward travel of each of said pins and plates to a predetermined point, resilient posts of insulating material mounted between said plates and block for normally projecting said plates outward to a common plane, said posts and pins of relative narrow width to retard electrical leakage, and said apertures beneath said several plates, disposed at considerable relative distances from each other to retard and attenuate any flow of electrical current from one plate to the other when said circuit is closed, with means for applying the plates to a material to be tested.

2. An apparatus for testing qualities of materials, comprising, a plurality of oppositely positioned condenser plates, spaced apart in width and length by gaps, a supporting member for applying the plates to material to be tested, an insulating block mounted on the supporting member and provided with apertures spaced apart therethrough, relatively narrow guide pins slidably mounted through said apertures and the outer ends of such pins attached to the said plates respectively for supporting such plates in varying positions in relation to material to be tested and for conducting electrical currents to said plates, resilient means mounted between said plates and said block adapted to press said plates severally and independently outward from said block and to maintain the faces of said plates respectively in contact with varying elevations of surfaces of materials to be tested, means for limiting the outward travel of said plates to a predetermined point and uniform plane, and electrical circuit wires of opposite poles respectively attached to the inner ends of said pins respectively for transmitting electrical currents to said plates.

3. An electrical apparatus for testing qualities of materials, comprising, a supporting frame, and insulating block attached to the frame in front thereof, a plurality of condenser plates oppositely mounted in spaced relation with each other in front of said block, said block provided with apertures therethrough in spaced relation beneath said plates respectively, supporting pins affixed to said plates and slidably disposed through said apertures respectively for supporting said plates in various distances from said block, means for limiting the outward travel of said pins, resilient cushions mounted between said block and said plates respectively adapted to maintain said plates severally in varying degrees of extension from said block for continually contacting varying elevations on the surface of material to be tested in front thereof, and electrical wires of opposite poles attached to said oppositely positioned pins respectively for transmitting electrical currents to said plates.

4. An electrical apparatus for testing qualities of materials as described in the foregoing claim 3, with the outer edges of said plates curved back from the front faces thereof, to facilitate the application of materials to be tested to said plates.

5. An electrical apparatus for testing qualities of materials, comprising a frame for applying the apparatus, an insulated supporting block attached to the frame and provided with oppositely positioned apertures in spaced relation therethrough, pins slidably mounted through said apertures, a plurality of condenser plates mounted on the outer ends of said pins respectively in opposite relation to each other and spaced apart by gaps, resilient cushions mounted between said block and said plates respectively to maintain said plates normally on the same plane, electrical circuit wires for opposite poles of electrical currents attached respectively to said oppositely positioned plates for transmitting electrical currents to said plates, and a second block of insulating on electrical conducting material adjustably positioned in front of said plates for limiting the travel of such electrical currents from said plates to the thickness of material to be tested.

6. An apparatus for testing qualities of materials by electrical currents, comprising a plurality of condenser plates separated by gaps and normally mounted on the same plane, and disposed at equal distances in all horizontal directions from each other for testing material of length and breadth in front of said plates, an insulating block beneath and connecting with said plates for maintaining the same in predetermined positions in separate circuits, circuit wires for conducting electrical currents of opposite poles attached respectively to said respective oppositely positioned plates, with means for applying such plates to material to be tested.

7. An electrostatic test device, comprising a supporting member, a pair of condenser plates disposed in front of said supporting member and adapted to occupy positions with their forward faces substantially in coplanar relation, said plates being electrically insulated from one another, and having opposed edges spaced apart by a gap, whereby an electrostatic field may extend between the forward faces of said plates, and means on said supporting member for supporting said plates in substantially coplanar relation in front of said supporting member for limited independent movement with relation to said supporting member to accommodate surface irregularities of the material to be tested, said last mentioned means including means limiting movement of said plates in a direction from said supporting member beyond a given substantially coplanar position, and resilient means for each plate yieldingly resisting movement of said plate toward said supporting member.

8. An electrostatic test device, comprising a supporting member, a pair of condenser plates disposed in front of said supporting member and adapted to occupy positions with their forward faces substantially in coplanar relation, said plates being electrically insulated from one another, and having opposed edges spaced apart by a gap, whereby an electrostatic field may extend between the forward faces of said plates, and means on said supporting member for supporting said plates in substantially coplanar relation in front of said supporting member for limited independent movement with relation to said supporting member to accommodate surface irregularities of the material to be tested, said last mentioned means including means limiting movement of said plates in a direction from said supporting member beyond a given substantially coplanar position, and resilient means on said supporting member yieldingly supporting said plates from said member at a predetermined gap width and resisting movement of said plates toward said supporting member.

9. An electrostatic device for testing qualities of materials, comprising a support block adapted to be placed in juxtaposition to the surface of a material to be tested, and a plurality of substantially sector-shaped condenser plates mounted on said block in coplanar relation with their straight edges parallel to one another and separated by uniform width gaps and adapted to be positioned by said block adjacent and parallel to the surface of said material to be tested.

10. An electrostatic device for testing qualities of materials, comprising a support block adapted to be placed in juxtaposition to the surface of a material to be tested, a set of four substantially quadrant-shaped condenser plates mounted on said block in coplanar relation and with their arcuate edges defining a circle and their straight edges parallel to one another and separated by uniform width gaps, said plates being adapted to be positioned by said block adjacent and parallel to the surface of said material to be tested, each pair of adjacent plates being electrically insulated from one another, and electrical conductors interconnecting each pair of plates located across from one another.

11. A high frequency electrostatic device for testing qualities of dielectric materials, comprising a support adapted to be positioned in juxtaposition to the surface of a material to be tested, and a plurality of substantially coplanar condenser plates mounted and electrically insulated from one another on said support and adapted to be positioned by said support adjacent and parallel to the surface of said material to be tested, said condenser plates having opposed edge portions of substantial length defining a high frequency gap of substantially uniform width, such that a high frequency electrostatic field extends across said gap between said edge portions and forwardly of said condensed plates to penetrate a material to be tested when said condenser plates are connected to a source of high frequency current.

12. A high frequency electrostatic device for testing qualities of dielectric materials, comprising a support adapted to be positioned in juxtaposition to the surface of a material to be tested, and a plurality of substantially coplanar, concentric, substantially circular condenser plates mounted and electrically insulated from one another on said support at substantially uniform radial spacing and adapted to be positioned by said support adjacent and parallel to the surface of said material to be tested, said condenser plates having opposed edge portions of substantial length defining a high frequency gap of substantially uniform width, such that a high frequency electrostatic field extends across said gap between said edge portions and forwardly of said condenser plates to penetrate a material to be tested when said condenser plates are connected to a source of high frequency current.

13. A high frequency electrostatic device for testing qualities of dielectric materials, comprising a support adapted to be positioned in juxtaposition to the surface of a material to be tested, and a plurality of substantially coplanar condenser plates mounted and electrically insulated from one another on said support and adapted to be positioned by said support adjacent and parallel to the surface of said material to be tested, said condenser plates having opposed edge portions of substantial length defining a high frequency gap of substantially uniform width, such that a high frequency electrostatic field extends across said gap between said edge portions and forwardly of said condenser plates to penetrate a material to be tested when said condenser plates are connected to a source of high frequency current, and said edge portions being disposed with different portions of said gap at substantially right angles to one another.

14. A high frequency electrostatic device for testing qualities of dielectric materials, comprising a support adapted to be positioned in juxtaposition to the surface of a material to be tested, and a plurality of substantially coplanar condenser plates mounted and electrically insulated from one another on said support and adapted to be positioned by said support adjacent and parallel to the surface of said material to be tested, said condenser plates having opposed edge portions of substantial length defining a high frequency gap of substantially uniform width, such that a high frequency electrostatic field extends across said gap between said edge portions and forwardly of said condenser plates to penetrate a material to be tested when said condenser plates are connected to a source of high frequency current, and said edge portions being disposed with different portions of said gap extending in different directions in the plane of the condenser plates.

15. A high frequency electrostatic device for testing qualities of dielectric materials, comprising a support adapted to be positioned in juxtaposition to the surface of a material to be tested, and a plurality of substantially coplanar condenser plates, one surrounding the other, mounted and electrically insulated from one another on said support and adapted to be positioned by said support adjacent and parallel to the surface of said material to be tested, said condenser plates having opposed edge portions of substantial length defining a high frequency gap of substantially uniform width, such that a high frequency electrostatic field extends across said gap between said edge portions and forwardly of said condenser plates to penetrate a material to be tested when said condenser plates are connected to a source of high frequency current.

16. A high frequency electrostatic device for testing qualities of dielectric materials, comprising a support adapted to be positioned in juxtaposition to the surface of a material to be tested, and a plurality of substantially coplanar condenser plates mounted and electrically insulated from one another on said support with their faces on one side exposed and adapted to be positioned by said support adjacent and parallel to the surface of said material to be tested, said condenser plates having opposed edge portions of substantial length defining a high frequency gap of substantially uniform width, such that a high frequency electrostatic field extends across said gap between said edge portions and forwardly of said condenser plates to penetrate a material to be tested when said condenser plates are connected to a source of high frequency current.

JAMES P. DALLAS.
ROBERT L. STEVENS.

CERTIFICATE OF CORRECTION.

Patent No. 2,123,812.   July 12, 1938.

ROBERT L. STEVENS, ET AL.

It is hereby certified that error appears in the printed specification of the above numbered patent requiring correction as follows: Page 4, first column, line 9, claim 5, for the words "on electrical" read nonelectrical; and second column, line 37, claim 11, for "condensed" read condenser; and that the said Letters Patent should be read with this correction therein that the same may conform to the record of the case in the Patent Office.

Signed and sealed this 4th day of October, A. D. 1938.

Henry Van Arsdale (Seal)   Acting Commissioner of Patents.

are connected to a source of high frequency current, and said edge portions being disposed with different portions of said gap at substantially right angles to one another.

14. A high frequency electrostatic device for testing qualities of dielectric materials, comprising a support adapted to be positioned in juxtaposition to the surface of a material to be tested, and a plurality of substantially coplanar condenser plates mounted and electrically insulated from one another on said support and adapted to be positioned by said support adjacent and parallel to the surface of said material to be tested, said condenser plates having opposed edge portions of substantial length defining a high frequency gap of substantially uniform width, such that a high frequency electrostatic field extends across said gap between said edge portions and forwardly of said condenser plates to penetrate a material to be tested when said condenser plates are connected to a source of high frequency current, and said edge portions being disposed with different portions of said gap extending in different directions in the plane of the condenser plates.

15. A high frequency electrostatic device for testing qualities of dielectric materials, comprising a support adapted to be positioned in juxtaposition to the surface of a material to be tested, and a plurality of substantially coplanar condenser plates, one surrounding the other, mounted and electrically insulated from one another on said support and adapted to be positioned by said support adjacent and parallel to the surface of said material to be tested, said condenser plates having opposed edge portions of substantial length defining a high frequency gap of substantially uniform width, such that a high frequency electrostatic field extends across said gap between said edge portions and forwardly of said condenser plates to penetrate a material to be tested when said condenser plates are connected to a source of high frequency current.

16. A high frequency electrostatic device for testing qualities of dielectric materials, comprising a support adapted to be positioned in juxtaposition to the surface of a material to be tested, and a plurality of substantially coplanar condenser plates mounted and electrically insulated from one another on said support with their faces on one side exposed and adapted to be positioned by said support adjacent and parallel to the surface of said material to be tested, said condenser plates having opposed edge portions of substantial length defining a high frequency gap of substantially uniform width, such that a high frequency electrostatic field extends across said gap between said edge portions and forwardly of said condenser plates to penetrate a material to be tested when said condenser plates are connected to a source of high frequency current.

JAMES P. DALLAS.
ROBERT L. STEVENS.

CERTIFICATE OF CORRECTION.

Patent No. 2,123,812.   July 12, 1938.

ROBERT L. STEVENS, ET AL.

It is hereby certified that error appears in the printed specification of the above numbered patent requiring correction as follows: Page 4, first column, line 9, claim 5, for the words "on electrical" read nonelectrical; and second column, line 37, claim 11, for "condensed" read condenser; and that the said Letters Patent should be read with this correction therein that the same may conform to the record of the case in the Patent Office.

Signed and sealed this 4th day of October, A. D. 1938.

Henry Van Arsdale (Seal)   Acting Commissioner of Patents.